United States Patent [19]

Tomita et al.

[11] 3,957,681

[45] May 18, 1976

[54] PROCESS FOR MANUFACTURING GASEOUS MIXTURES RICH IN HYDROGEN

[75] Inventors: Tadayoshi Tomita, Yokohama; Katsutoshi Kikuchi, Fujisawa; Takayuki Sakamoto, Tokyo, all of Japan

[73] Assignee: Toyo Engineering Corporation, Tokyo, Japan

[22] Filed: Nov. 7, 1974

[21] Appl. No.: 521,865

Related U.S. Application Data

[63] Continuation of Ser. No. 178,264, Sept. 7, 1971, abandoned.

[30] Foreign Application Priority Data

Sept. 4, 1970    Japan.................................. 45-77613

[52] U.S. Cl.............................. 252/373; 48/214 A; 252/463; 208/106
[51] Int. Cl.$^2$...................... C01B 2/10; C01B 2/14
[58] Field of Search ............. 252/373, 463; 48/214, 48/215

[56] References Cited
UNITED STATES PATENTS

| 2,654,661 | 10/1953 | Gorin | 48/197 R |
|---|---|---|---|
| 2,654,663 | 10/1953 | Gorin | 48/197 R |
| 2,682,459 | 6/1954 | Stanier | 48/214 |
| 3,048,476 | 8/1962 | Dwyer | 252/373 |

OTHER PUBLICATIONS

Michel, Gas und Wasserfach, 95, 1954, pp. 598–603.

Lawton et al., 4th Congress International du Chauffage Industriel, Paris, 1952 Preprint 199 pp. 1–8.

Stania et al., Institute of Gas Engineers, Comm. No. 375 (1950) pp. 10–25.

Primary Examiner—Howard T. Mars
Attorney, Agent, or Firm—Woodhams, Blanchard and Flynn

[57] ABSTRACT

A hydrogen manufacturing process is carried out by catalytic steam reforming of normally gaseous or liquid hydrocarbons using a catalyst comprising substantially silica-free aluminum oxide at temperatures above 850°C., the catalyst optionally also comprising more than 10 weight percent, preferably more than 20 weight percent, of at least one of the group consisting of beryllium oxide, calcium oxide and strontium oxide.

3 Claims, 8 Drawing Figures

PROCESS FOR MANUFACTURING GASEOUS MIXTURES RICH IN HYDROGEN

This is a continuation of application Ser. No. 178,264, filed Sept. 7, 1971, and now abandoned.

This invention relates to the catalytic steam reforming of hydrocarbons, using a silica-free catalyst, to produce a gaseous mixture that is rich in hydrogen.

BACKGROUND OF THE INVENTION

In the production of hydrogen gas from hydrocarbons, i.e. the conversion of normally liquid or gaseous hydrocarbons by cracking to products of lower molecular weight, two general processes have been widely employed in the art; (1) a process in which hydrocarbons are mixed with an oxidizing agent to effect partial oxidation, and (2) a process in which hydrocarbons and steam are heated together in a process known as steam reforming.

The process (1) is applicable to a wide range of hydrocarbon feeds, ranging from methane to distillation residue from mineral oils. It has, however, the distinct disadvantage that substantially pure oxygen is required as the only practical oxidizing agent.

In process (2), even though pure oxygen is not required for cracking, the range of hydrocarbon feed is severely limited. This is because the process is markedly sensitive to carbon deposition. This tendency toward carbon deposition increases as the molecular weight of the starting feed is increased, and is especially marked during the use of the conventional nickel oxide catalyst. Hence, only hydrocarbons of low molecular weight can be used in (2), and industrial utilization of hydrocarbons heavier than naphtha (light oil) has not been feasible.

Another problem that is prominent in prior art hydrocarbon cracking to form gaseous mixtures is the poisoning effect of sulfur on the catalysts in prior use. This requires desulfurization of the feed to a sulfur content of less than about 0.2 ppm.

The steam reforming reaction is an endothermic reaction and, disirably the reaction is carried out at high temperatures. However, the prior catalysts containing nickel oxide and oxides of alkali metal as a main ingredient have a disadvantage in that, at a high temperature, e.g. about 850°C., this catalyst ingredient reacts with its refractory carrier to form a solid solution, and hence rapidly becomes deactivated.

The present invention provides a process for steam reforming of various hydrocarbons without the above disadvantages.

For the purpose of finding a process for gasifying fractions heavier than naphtha, including kerosene, light oil, etc. according to steam reforming reaction, the inventors tried to utilize those fractions heavier than naphtha and found that carbon deposition on the catalyst was generally marked, and that activity of the catalyst under these circumstances lowered rapidly.

In generaly, hydrocarbons become unstable and their decomposition points become lower as the number of carbon atoms increases. Accordingly, cracking heavy hydrocarbons is possible at a low temperature, and some prior preliminary investigations of cracking these materials have been made. The equilibrium composition in the steam reforming reaction at a low temperature, contains methane in a large proportion, and this is hence unsuitable when hydrogen gas of a high purity is desired. Moreover, precipitation of carbonaceous materials cannot be avoided.

As an example of these prior investigations, it has been reported that the quantity of methane is 31.7 percent in a dry gas which is in a thermodynamic equilibrium state at 500°C., and 30 kg/cm²G and the proportion of steam to carbon in the process is 3.

The following experiments are given to illustrate basic relationships. To illustrate steam reforming reaction of hydrocarbons at a temperature above 800°C., a mixture of hydrocarbons and steam was first passed through a hollow tube heated externally. Experimental conditions were as follows:

| | |
|---|---|
| Hydrocarbon supplied: | Kuwait crude oil fractions having end point of 170°C. |
| Quantity of hydrocarbon: | 6.94 g/min. |
| Molar ratio of steam to carbon: | 4.0 |
| Reaction temperature | 1,100°C. |
| Quantity of gas produced: | 23.2 Nl/min. |
| Composition of produced gas (vol. %): | $H_2$ 65.3, $CH_4$ 9.6, CO 18.4, $CO_2$ 6.5, $C_2H_4$ 0.1, $C_2H_2$ 0.1 |
| Rate of gasification of carbon: | 75.0% |

The results of observations made during the progress of the reaction within the reaction zone are shown in FIG. 1 of the accompanying drawings.

In FIG. 1, the distance between the inlet and outlet of the reaction zone is shown on the abscissa in equal increments, and the rate of gasification of carbon is shown on the left ordinate on a log scale. The change in the rate of gasification of carbon is shown by a broken line in the figure.

Rate of gasification of carbon as used herein is defined as follows:

$$\text{Rate of gasification of carbon (\%)} = \frac{\text{Quantity of carbon in produced gas}}{\text{Quantity of carbon in supplied hydrocarbons}} \times 100$$

In the same manner, selectivity is shown on the right ordinate on a log scale. The change in selectivity of the gas producing reaction for the respective components in the resulting gaseous mixture obtained from the carbon in the supplied hydrocarbons is shown by solid lines.

Considering the basic relationships as shown in FIG. 1, it is noted that the uppermost broken line showing the rate of gasification of carbon decreases to a point near the outlet of the reaction zone, and this suggests that the supplied hydrocarbons are not reacted with steam but merely thermally cracked into ethylene or acetylene. If residence time is extended in order to reduce the residual hydrocarbons, precipitate of carbonaceous substance is increased in amount.

This is clearly indicated by the curves showing selectivities of acetylene and ethylene, respectively, and also by the curves showing selectivities of steam, carbon monoxide and carbon dioxide in FIG. 1.

In the production of olefins by the thermal cracking of hydrocarbons, a method is used in which the residence time in the reaction zone is short so as to avoid precipitation of carbon. However, if the object is the production of hydrogen, the residence time cannot be shortened without causing an increase in the quantity of non-reacted materials or intermediate products.

Attempts therefore to attain a process for gasification situated between the conventional catalytic steam reforming process and the prior non-catalytic partial oxidizing process from the standpoint of the varieties of starting hydrocarbons and reaction temperatures, revealed that any significant increase in rate of gasification of carbon cannot be achieved in the reaction carried out in a reactor having no catalyst as above described.

BRIEF STATEMENT OF THE INVENTION

On the basis of the above finding, it was discovered surprisingly that catalysts of known low activities can be used to achieve results heretofore unattainable with using highly active and highly sensitive steam reforming catalysts, or unattainable using a process in which no catalyst is used. The discovery characterizing the invention thus achieves the desirable results of both processes (1) and (2), above. It was found that such catalysts can be selected as described below, and thus the principle of the process of the present invention was arrived at.

BRIEF DESCRIPTION OF THE DRAWINGS

The drawings are graphic representations of factors encountered in steam cracking.

Further illustrative experimentation illustrating additional basic relationships is as follows.

A principal ingredient of catalysts usually used in steam reforming of light hydrocarbons is nickel oxide. However, not nickel oxide but according to the above principle aluminum oxide, of a high purity having a high stability at high temperatures and being compatible with water molecules was selected as a species of the process of the present invention. Nickel oxide is a so-called P-type semi-conductor notoriously inclined to accelerate carbon deposition and also prone to be poisoned by sulfur in an amount of 5 ppm or more. The experiment below was designed to test the behavior of aluminum oxide in these aspects.

| Hydrocarbon supplied: | Minas crude oil fractions having final boiling point of 290°C. |
|---|---|
| Quantity of the hydrocarbon: | 7.87 g/min. |
| Molar ratio of steam to carbon: | 4.0 |
| Reaction temperature | 1,100°C. |
| Quantity of gas evolved: | 32.7 Nl/min. |
| Composition of evolved gas (vol. %): | $H_2$ 63.7, $CH_4$ 9.0, CO 11.9, $CO_2$ 15.4 |
| Rate of gasification of carbon: | 95.2% |

Figure 2:
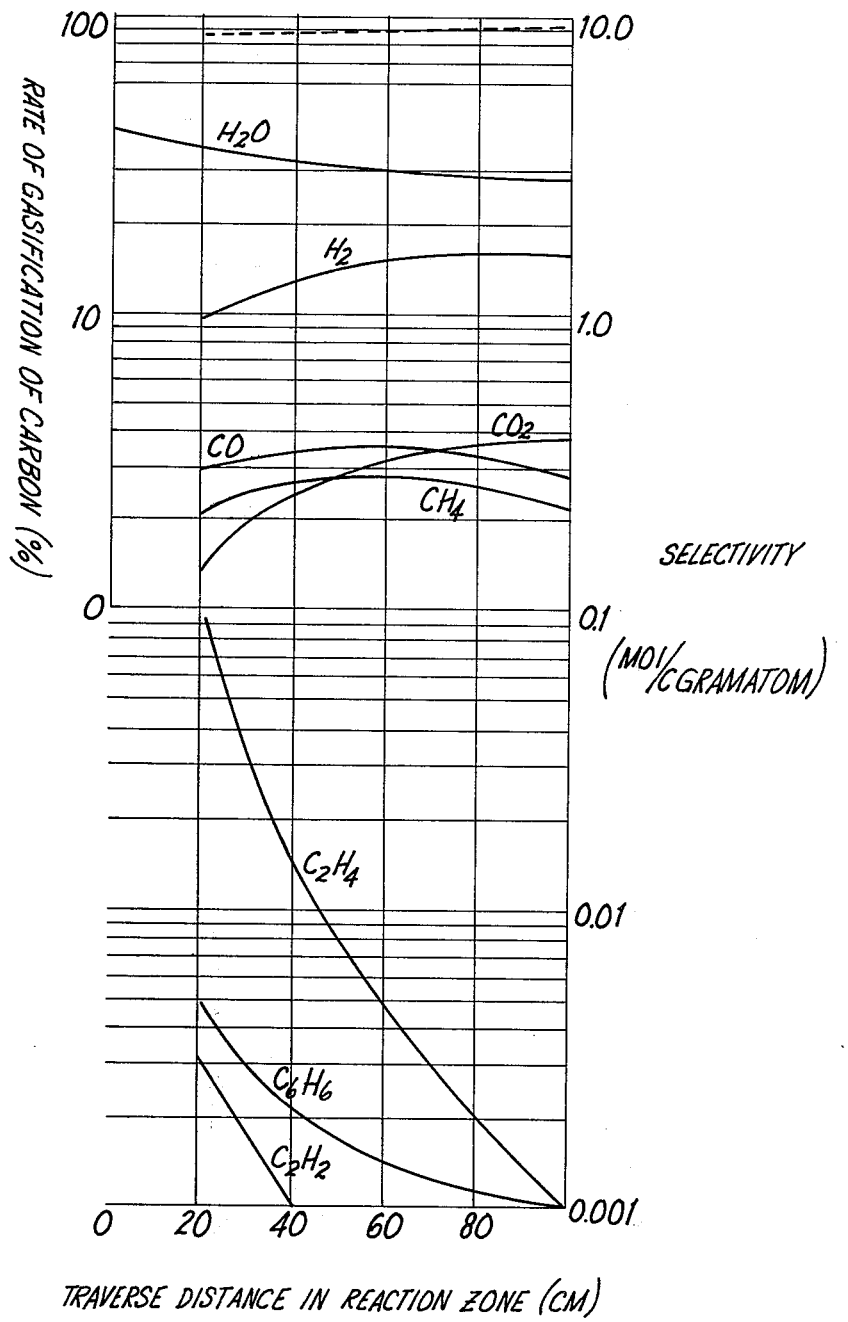

The results of observations made during the progress of the reaction in the reaction zone in this experiment are shown in FIG. 2.

Then, the same reaction was carried out in the presence of γ-aluminum oxide under the following conditions:

| Hydrocarbon supplied: | Minas crude oil fractions having an end point of 290°C. |
|---|---|
| Quantity of the hydrocarbon: | 7.87 g/min. |
| Reaction temperature: | 1,100°C. |
| Quantity of gas evolved: | 37.1 Nl/min. |
| Composition of the evolved gas (vol. %): | $H_2$ 69.4, $CH_4$ 2.4, CO 14.5, $CO_2$ 13.7 |
| Rate of gasification of carbon: | 95.0% |

Figure 3:
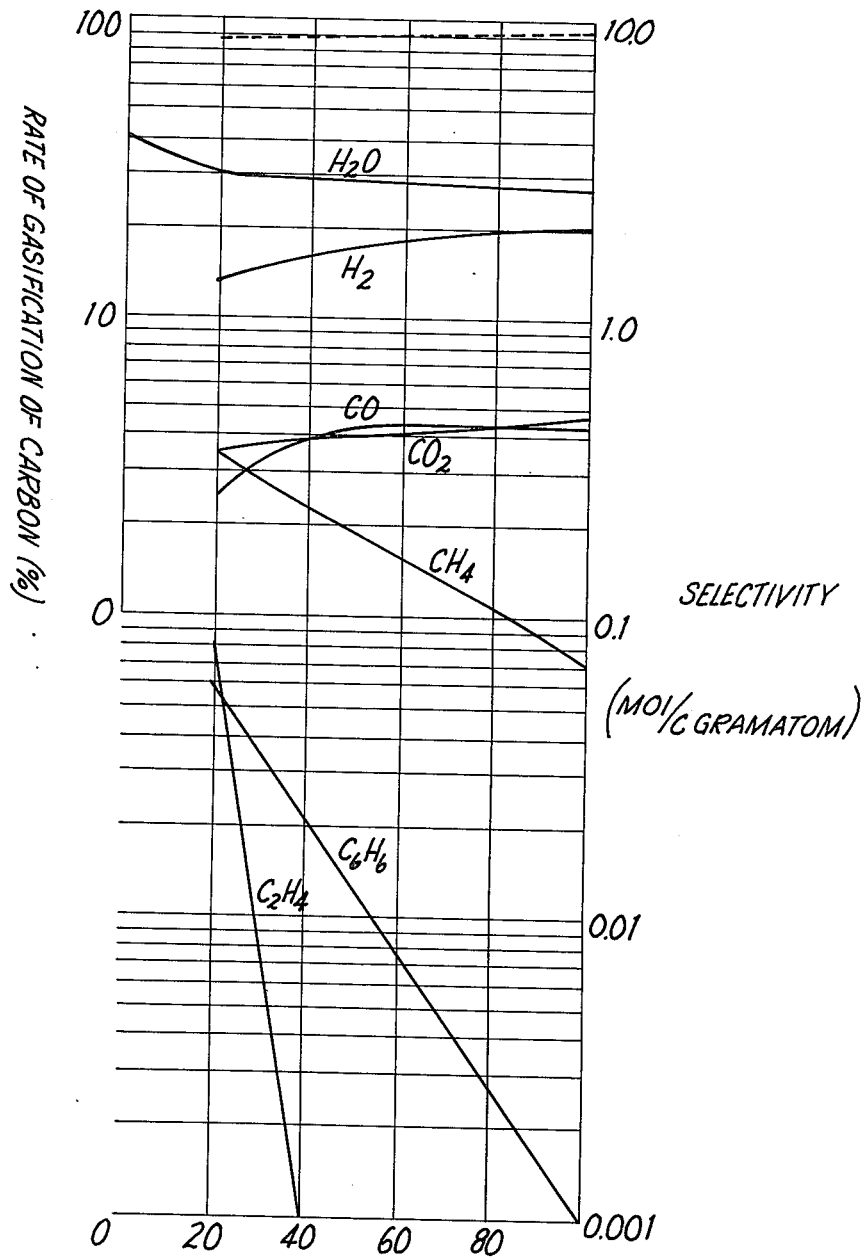

The results of observation of progress of the reaction in the reaction zone in this experiment are shown in FIG. 3.

Figure 1:
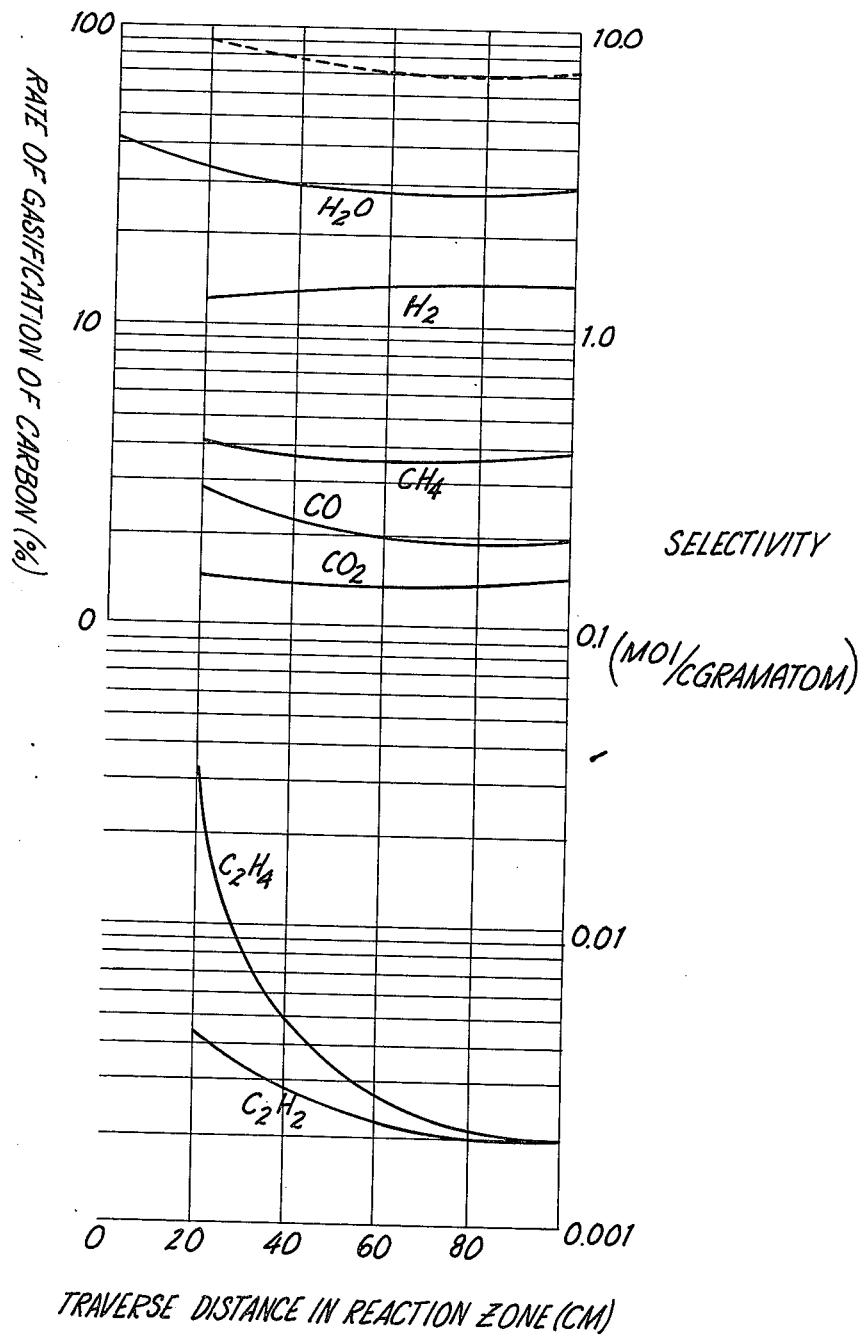
FIGS. 1, 2 and 3 show the relationships between change in rates of the gaseous conversions of carbon of conventional hydrocarbon feeds under steam cracking conditions, the rates of selectivity of the conversion relative to the gaseous components, and traverse distance, i.e. residence time in the reaction zone.

Negative expectation has previously been given generally to the catalytic action at a high temperature above 1,000°C. and, commonly such a material in an atmosphere of high temperature has been considered to be a mere heat transfer medium. Comparing FIGS. 1, 2 and 3, it will be clearly seen that the different results in the case of the two aluminum oxides can logically be ascribable only to differences in catalytic action, and not to mere heat transfer phenomena.

A notably significant result in the cases wherein α-aluminum oxide or γ-aluminum oxide was used in the reaction zone is that surprisingly no carbon deposition occured at all on the surface of the catalyst. If the reaction is stopped to examine the catalyst, it is found that its surface is clean and pure white in color except for the inlet part of the catalyst layer.

If silicon dioxide is incorporated as an arbitrary impurity in aluminum oxide and the concentration of the impurity is increased, carbon deposition begins to occur on the surface of the catalyst. At a silicon dioxide content of about 10 wt. percent, the surface of the catalyst cannot be kept clean, and it is covered with carbon deposit with a short period of time.

Similar deposition also occurs if substances other than silicon dioxide such as oxides of elements of Group IV in the Periodic Table and heavy metal oxides are incorporated as impurities in amounts higher than about 10 percent.

In view of the above described facts, it can be seen that one of the characteristics of aluminum oxide is its newly discovered catalytic action for accelerating the reaction of hydrocarbons, especially carbonaceous materials with steam.

Gasification of a crude oil in the presence of α-aluminum oxide was carried out to obtain the following good results:

Hydrocarbon supplied:
Kuwait crude oil
Fraction having a final boiling point of below 100°C.: 10.27 wt. percent
Naphtha: 12.58
Kerosene and light oil: 25.89
Lubricating oil: 29.90
Asphalt: 20.85
Quantity of the hydrocarbon: 8.44 g/min.
Molar ratio of steam to carbon: 4.0
Reaction temperature: 1,100°C.
Quantity of gas evolved: 34.4 Nl/min.
Composition of the evolved gas (vol. %): $H_2$ 64.7, $CH_4$ 9.4, $CO$ 12.3, $CO_2$ 13.8
Rate of gasification of carbon: 90.3%

Figure 4:
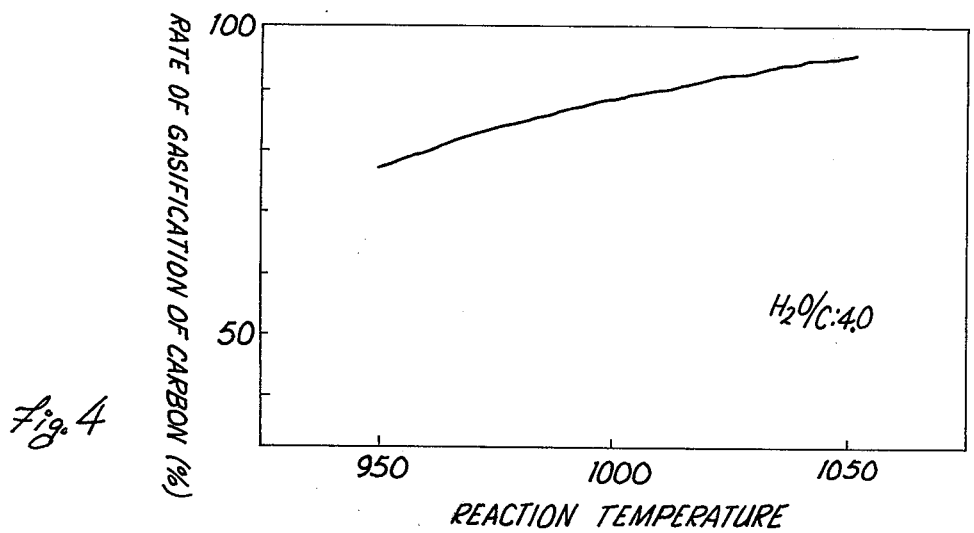
FIG. 4 is a graph showing the relation between the rate of gasification of carbon and reaction temperature.
Figure 5:
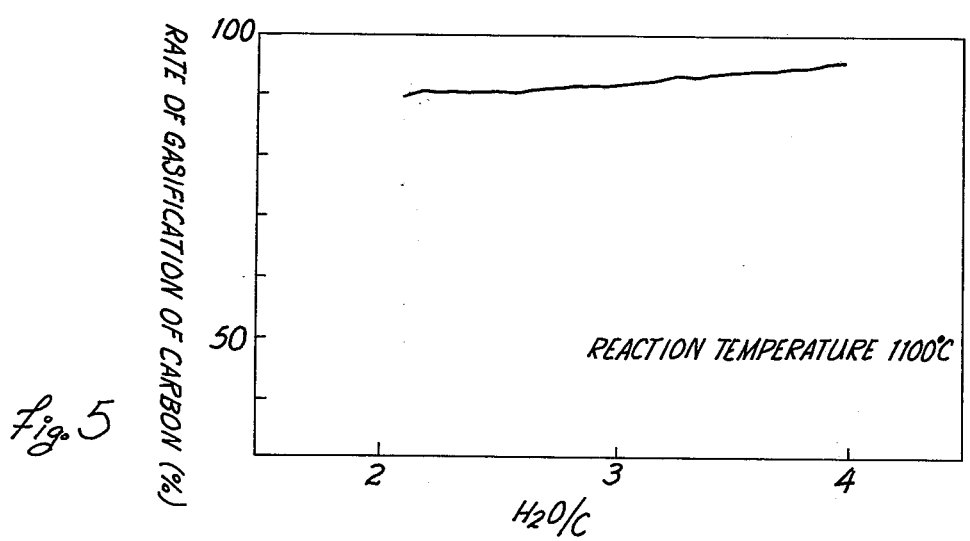
FIG. 5 is a graph showing the relationship between the rate of gasification of carbon and the molar ratio of steam to carbon.

The relations between reaction temperature as a factor influencing the catalytic action of aluminum oxide and the rate of gasification of carbon, and also between the molar ratio of steam to carbon as a factor influencing the catalytic reaction, and the rate of the gasification in experiments are shown in FIGS. 4 and 5, respectively.

Thus, the influence of reaction temperature is substantial, and good results are obtained at temperatures above 1,000°C. Moreover, the influence of the proportion of steam to carbon is relatively small.

The results obtained in an experiment showing that the influence of sulfur which is consistently troublesome as a catalyst poison, are shown below:

Hydrocarbon supplied: Kuwait crude oil fractions
Final boiling point: 315°C.
Composition (wt. %):
C 85.78
H 14.07
S 0.43
Quantity of the hydrocarbon: 7.56 g/min.
Molar ratio of steam to carbon: 4.1
Reaction temperature: 1,100°C.
Quantity of gas evolved: 32.1 Nl/min.
Composition of the evolved gas (vol. %): $H_2$ 64.0, $CH_4$ 10.8, $CO$ 11.2, $CO_2$ 13.8
Rate of gasification of carbon: 95.9%

A fraction having a relatively very high sulfur content of 4,300 ppm. was used in the experiment, but no influence thereof was detected and no change of the aluminum oxide used as catalyst was found.

In the above described investigations, it is shown that aluminum oxide used alone is capable of gasifying carbonaceous materials at temperatures above 1,000°C., and particularly, it is capable of gasifying hydrocarbons containing 20 percent of distillation residual oil such as crude oils at a high rate of gasification of carbon of above 90 percent. On the basis of this finding, the inventors turned to catalysts composed of plural ingredients. i.e. of aluminum oxide and other metal oxides, particularly basic metal oxides, for achieving additionally industrially advantageous results. After experiments as described below it has been found that substantial carbon deposition does not occur in the gasification of hydrocarbons, particularly heavy hydrocarbons containing residual oils, by using catalysts composed of aluminum oxide and one or more members selected from the group consisting of beryllium oxide, calcium oxide and strontium oxide as principal second ingredients, and that the gasification reaction proceeds smoothly at a temperature slightly lower than the temperature employed using aluminum oxide alone.

Catalysts used in the process of the present invention include sintered products of aluminum oxide and one or more members selected from the group consisting of beryllium oxide, calcium oxide and strontium oxide.

Although the particular action of each separate ingredient of the catalyst compositions obtained by combining these ingredients has not yet been determined, oxides of alkaline earth metals such as beryllium oxide, calcium oxide and strontium oxide have an inherent action of controlling dehydrogenation reactions of hydrocarbons to inhibit thermal polymerization.

Aluminum oxide accelerates the reaction of hydrocarbons and steam. If the catalysts are sintered or crystallized, aluminum oxide is firmly combined with the alkaline earth metal oxides mainly in a spinel-like structure to increase the mechanical strength of the molded catalysts.

There has been proposed in the past a theory that at temperatures above 600°C., catalysts such as the above are inactivated and act merely as heat transfer media, because the hydrogen ion concentration on the surface of the catalysts is reduced rapidly. However, the surprising action of the catalysts described above of controlling the dehydrogenation reaction of hydrocarbons to prevent carbon deposition is considered to be owing to the action of outer shell electrons of atoms constituting the catalysts, and, further, that the outer shell electrons of the catalysts are easily activated at a high temperature. Therefore, the action of the catalysts in concomitantly preventing carbon deposition at a high temperature is remarkable.

The compositions of the catalysts used in the process of the present invention are characterized in that the ability of the alkaline earth metal oxides to prevent carbon deposition is lowered as the quantity of aluminum oxide is increased. Accordingly, the alkaline earth metal oxide content should be at least 10 wt. percent, and consequently, the aluminum oxide content should be at most 90 wt. percent.

Further, the range of the catalyst content of the optional ingredient, calcium oxide, is 10 to 60 wt. percent, that of beryllium oxide is 20 to 60 wt. percent, and that of strontium oxide is 20 to 60 wt. percent. In ternary and quaternary mixtures the content of beryllium oxide can be lowered as low as 6 percent if the content of the remaining optional ingredients is as above.

In the process of the present invention, a reaction temperature above 850°C. is suitable and it can be above 1000°C., even up to 1,100°C. In case raw materials having a high heavy hydrocarbon content are used, a relatively high temperature within said range is preferably employed and, on the other hand, in case of high light hydrocarbon content, a relatively low temperature is preferably employed.

Space velocity of flow of the reactants in the process of this invention is within the range of 1,000 – 3,000/Hr. The steamcarbon molar ratio can be from 2 to 10.

The reaction can be carried out under atmospheric pressure or above. The operating pressure is not critical and can be any pressure between atmospheric and 300 atm.

In the reaction of the present invention, reactors containing at least one fixed catalyst bed, or fluidized beds or spouted beds can be used.

The heat of reaction can be supplied by means of either the externalized heating system in which the reactor is heated externally through a heat exchange wall; or the so-called internal heating system in which an appropriate quantity of oxygen or oxygen rich air is supplied to the reactor, and the heat generated by partial oxidation of the raw materials is utilized.

There is no particular influence of impurities such as sulfur contained in raw materials supplied as will be explained below. Therefore, no limitation of composition of raw materials within those ranges normally occurring in the conventional oil materials in necessary.

The invention includes reforming heavy oils such as crude oils as well as naphtha, kerosene or light oil fractions derived from these crudes, and mixtures of light oils and crudes. The light oils are those containing from 6 to 8 carbon atoms such as heptanes, octanes, and the like.

If feedstock oils such as crude oils containing residual base oils are used, the reaction should be carried out at a temperature above 950°C. in order to prevent carbon deposition. In general, eutectic crystals of aluminum oxide and alkaline earth metal oxides are stable enough and durable for a long period of time at such a high temperature.

Generally, heavy oils have high sulfur contents, and the inventors have used Kuwait crude oil having a particularly high sulfur content as raw material, but no sulfur compound occurred on the catalyst and no lowering in activity of the catalyst was detected.

Beryllium oxide is relatively expensive and, therefore, its content in the catalyst can be minimized for economical reasons. However, it has been found after experiments on various compositions that the presence of free beryllium oxide in the catalyst in addition to beryllium oxide constituting crystalline eutectic is quite effective in preventing carbon deposition in the steam reforming reaction.

In binary system of beryllium oxide and aluminum oxide, crystalline $BeO\cdot Al_2O_3$ is produced relatively readily. The beryllium oxide content of the catalyst should be at least 20 wt. percent, preferably higher than 30 wt. percent.

Beryllium oxide has the following characteristic advantages even though it is expensive, as above mentioned.

First, carbon deposition is prevented by beryllium oxide even at a relatively low temperature.

In case the calcium oxide - aluminum oxide catalyst shown below is used, a reaction temperature of 1,050°–1,100°C. is necessary to prevent carbon deposition in steam reforming of Kuwait crude oil. On the other hand, when a beryllium oxide — aluminum oxide catalyst is used, carbon deposition does not occur even at reaction temperatures of 950°– 1,050°C.

Second, the important property of thermal conductivity of beryllium oxide is extremely high, and accordingly, thermal conductivity of the catalyst containing beryllium oxide is also high.

Thermal conductivities of beryllium oxide and other oxides at 1,000°C. is shown below (Kcal./m. hr.°C.):

| BeO | $Al_2O_3$ | CaO | $SiO_2$ | MgO |
|---|---|---|---|---|
| 16.56 | 5.04 | 6.12 | 4.32 | 5.76 |

Thus, the thermal conductivity of beryllium oxide is about 3 times those of the other oxides shown.

In performing an endothermic reaction at a high temperature as in the steam reforming reaction using an external heating system, it is very important from an economic standpoint to maintain a low temperature at the heated surfaces of the reactor. Therefore, catalysts containing beryllium oxide are industrially advantageous, because they afford low reaction temperatures and, moreover, low temperatures of the heated surface of the reactor and consequently of the heat source.

It has also been found that carbon deposition is substantially eliminated in gasification of hydrocarbons and particularly heavy hydrocarbons containing residual oil by using catalysts containing aluminum oxide and calcium oxide as principal ingredients and the crystalline eutectic form is desirable.

Various compositions comprising calcium oxide and aluminum oxide were prepared experimentally and tested by X-ray diffraction in determining that the calcium oxide content should be less than 60 wt. percent to obtain sufficient mechanical strength for catalyst use. If the calcium oxide content is above 60 wt. percent, free calcium oxide is formed and it has a tendency to powder.

It has been disclosed above that the crystalline eutectic of calcium oxide and aluminum oxide and the crystalline eutectic of beryllium oxide and aluminum oxide accelerate cracking or reforming reaction of hydrocarbons, particularly heavy hydrocarbons, and that they also prevent carbon deposition during the reaction. It has also been found that strontium oxide has a similar, very effective action and that effective catalytic action can be obtained by incorporating strontium oxide and aluminum oxide in said crystalline eutectic form.

Ordinarily strontium oxide is considerably difficult to form into molded shapes, but it has been found that if strontium oxide catalyst is used in powder form or in a suitably molded form, its catalytic effect, and particularly the effect of preventing carbon deposition, compares with that of beryllium oxide.

As compared with catalysts containing calcium oxide, catalysts containing beryllium oxide show good capacity for preventing carbon deposition in cracking or reforming reaction at lower temperatures, and their behavior in this respect is the same as catalysts containing strontium oxide.

The present cost of strontium oxide is about one tenth of that of beryllium oxide, and our discovery that strontium oxide has essentially the same catalytic properties in our process is therefore industrially quite significant.

The sulfur content of heavy hydrocarbons is notoriously high and experiments using Kuwait crude oil, having a particularly high sulfur content, have been carried out in accordance with this invention for the purpose of ascertaining the poisoning effect of sulfur on the catalyst of this invention. Neither the formation of sulfur compounds on the catalysts nor any lowering in capacity of the catalysts was detected.

DETAILED DESCRIPTION

The process of the present invention will be illustrated by means of the following Examples.

In the following Examples, the reactor used was a tubular reactor of 1,000 mm in length and 50 mm in inner diameter, in which catalyst pellets of 10 mm in length and 10 mm in diameter were filled.

The tubular reactor was placed and heated in an electric furnace.

Kuwait crude oils in the following Examples have properties listed below.

| Specific gravity: 0.8532 (20/4°C.) |  |
|---|---|
| Elementary analysis (wt. %): | |
| C = 85.08, H = 12.50, S = 2.93 | |
| ASTM Distillation | °C. |
| IBP | 33.0 |
| 10% | 90.5 |
| 20% | 145.0 |
| 30% | 189.5 |
| 40% | 253.0 |
| 50% | 321.0 |
| 60% | 357.0 |
| 70% | 364.0 |

Space velocity of reactant flow in the reactor was 2,000 $Hr^{-1}$ in the following Examples.

The invention includes also the use of substances not shown in the following Examples as fillers or binders.

EXAMPLE 1

Mixtures of beryllium oxide powder and aluminum oxide powder in the following four different proportions were blended with water, molded and calcined under heating at 1,300°C. for several hours to obtain $BeO/Al_2O_3$ catalysts.

By using those catalysts, n-heptane was steam-reformed to obtain the following results:

| BeO content (wt. %) | Reaction temperature (°C) | Steam carbon (molar ratio) | Composition of evolved gas (vol. %) | | | | | Carbon deposition |
|---|---|---|---|---|---|---|---|---|
| | | | $H_2$ | CO | $CO_2$ | $CH_4$ | $C_2H_4$ | |
| 10 | 900 | 3.0 | 56.8 | 6.2 | 19.5 | 15.0 | 2.5 | + |
| 10 | 1,000 | 3.0 | 59.5 | 7.5 | 19.8 | 11.0 | — | + |
| 20 | 900 | 3.0 | 55.2 | 6.0 | 19.0 | 17.2 | 2.5 | none |
| 20 | 1,000 | 3.0 | 60.5 | 7.2 | 19.7 | 12.5 | — | none |
| 30 | 900 | 3.0 | 54.0 | 5.8 | 19.1 | 18.5 | 2.5 | none |
| 40 | 900 | 3.0 | 54.2 | 5.2 | 19.2 | 19.0 | 2.5 | none |

If $BeO/Al_2O_3$ catalysts are used, it is preferred that BeO content is 20 wt. percent and above. EXAMPLE 2

Kuwait crude oil was steam-reformed by using the same catalyst as in the above Example to obtain the following results:

| BeO content (wt. %) | Reaction temperature (°C) | Steam/ carbon (molar ratio) | Composition of evolved gas (vol. %) | | | | | Carbon deposition |
|---|---|---|---|---|---|---|---|---|
| | | | $H_2$ | CO | $CO_2$ | $CH_4$ | $C_2H_4$ | |
| 30 | 950 | 4.0 | 53.0 | 5.2 | 19.5 | 20.8 | 1.5 | slight |
| 30 | 1,000 | 4.0 | 54.3 | 7.6 | 19.5 | 17.0 | 0.5 | none |
| 30 | 1,050 | 4.0 | 55.2 | 16.1 | 19.0 | 9.8 | — | none |

When reaction temperature of 950°C. was employed in the above experiments, deposition of very small amount of carbon was observed from raw materials of high carbon contents such as Kuwait crude oil.

EXAMPLE 3

Kuwait crude oil was steam-reformed by using the catalyst used in Example 2 (i.e. $BeO/Al_2O_3$ having BeO content of 30 wt. percent) under pressure of 30 kg/cm² to obtain the following results:

| BeO content (wt. %) | Reaction temperature (°C) | Steam/ carbon (molar ratio) | Composition of evolved gas (vol. %) | | | | Carbon deposition |
|---|---|---|---|---|---|---|---|
| | | | $H_2$ | CO | $CO_2$ | $CH_4$ | |
| 30 | 1,050 | 4.0 | 57.2 | 12.1 | 13.2 | 18.0 | none |

Figure 6:
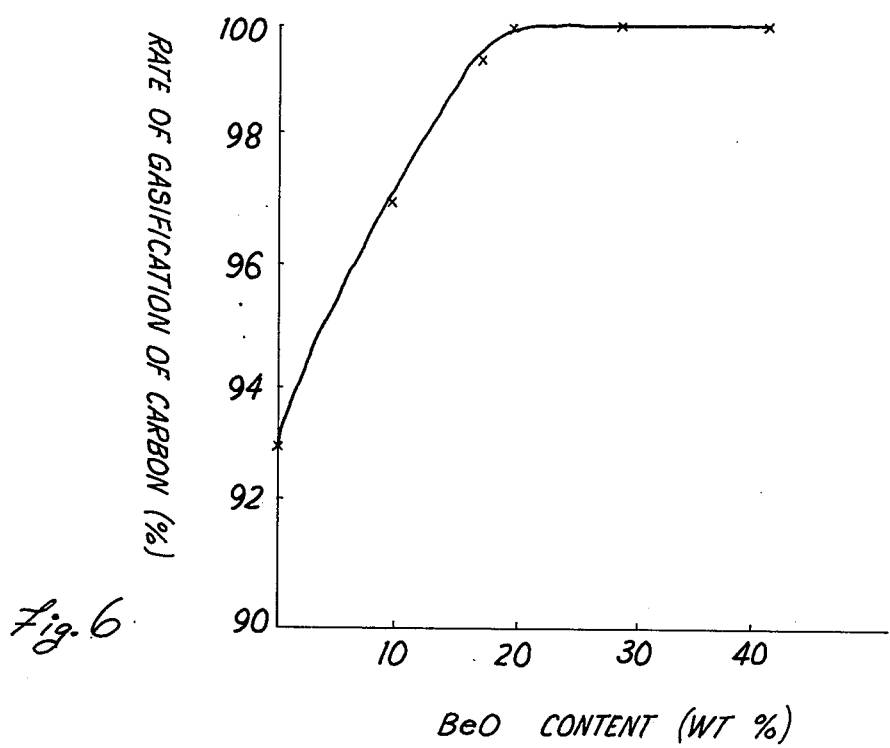
FIG. 6 is a graph showing the relationship between the change in rate of the gasification of carbon and change in beryllium oxide content in the catalyst.

FIG. 6 is a graph showing relation between change in rate of gasification of carbon and change in beryllium content in a catalyst.

EXAMPLE 4

Figure 7:
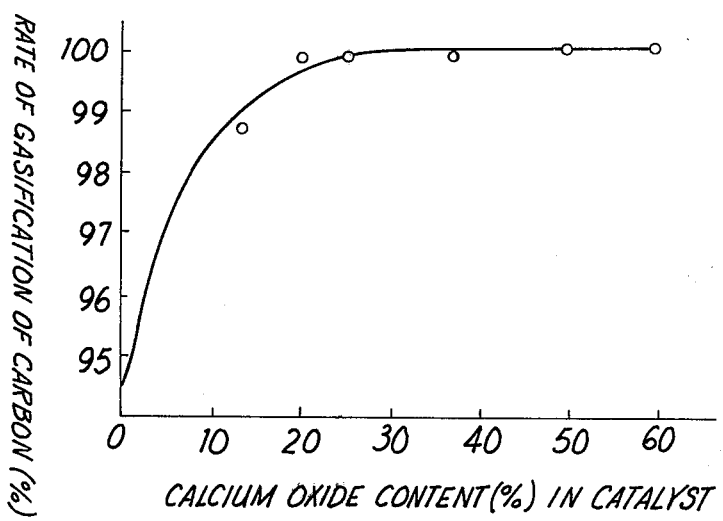
FIG. 7 is a graph showing the relation between the change in rate of gasification of carbon and change in calcium oxide content in the catalyst.
Figure 8:
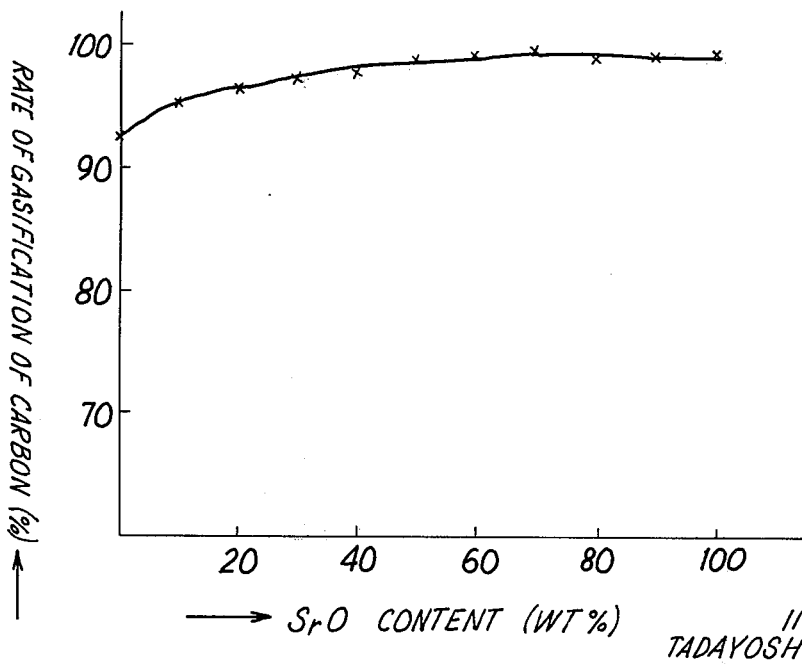
FIG. 8 is a graph showing relation between the change in rate of gasification of carbon and change in strontium content in a catalyst.

FIG. 7 shows the results of an experiment on steam-reforming of a light fraction of Kuwait crude oil in the presence of calcium oxide/aluminum oxide catalyst. Operation conditions and catalyst compositions in the experiment were as follows:

| Properties of the crude oil fraction: | |
|---|---|
| End point: | 360°C. |
| Specific gravity: | 0.7835 |

| Operation conditions: | |
|---|---|
| Temperature: | 1,000°C. |
| Pressure: | atmospheric pressure |
| $H_2O/C$ (molar ratio): | 4 |

| Catalyst compositions (wt. %): | | | |
|---|---|---|---|
| | $Al_2O_3$ | CaO | Other inorganic matters |
| 1. | 99.0 | 0 | 1.0 |
| 2. | 85.0 | 13.3 | 1.7 |
| 3. | 78.1 | 20.0 | 1.9 |
| 4. | 72.9 | 25.0 | 2.1 |
| 5. | 60.4 | 37.1 | 2.5 |
| 6. | 47.3 | 50.0 | 2.7 |
| 7. | 37.4 | 59.9 | 2.7 |

It is clear from FIG. 7 that calcium oxide content of higher than 10 wt. percent, preferably in the range of 20 to 60 wt. percent is effective in preventing carbon deposition.

After investigations on the resistance of the catalysts of the present invention to sulfur, the inventors have found very favorable activities of the catalysts as shown below.

As shown in the following Examples, steam reforming of crude oils even containing 1 – 3 wt. percent of sulfur can be carried out causing substantially no lowering of activities of the catalysts. It has been clarified that sulfur compounds of both aluminum and calcium, i.e. $Al_2S_3$ and $CaS$, are unstable at a high temperature particularly in the presence of steam and that, though sulfur in the raw oils is converted into hydrogen sulfide, neither CaS nor $Al_2S_3$ is generated.

Examination of sulfur content of catalysts according to fluorescent X-rays after they were used in Examples revealed that substantially no sulfur atom existed.

Examples of steam reforming processes in which catalysts of the present invention are used will be given below to make the effects thereof clearer.

EXAMPLE 5

Naphtha fraction was steam reformed. Catalyst composition, raw material composition, product composition and carbon deposition were as follows:

```
Catalyst composition (wt. %)
    Al2O3: 47.3,   CaO: 50.0,
    other inorganic matters: 2.7
Properties of crude oil (Kuwait crude oil fraction)
    Final boiling
    point:                    180°C.
    Specific gravity:         0.7413
    Elementary ana-
    lysis (wt. %):            C: 85.24,  H: 14.74,
                              S: trace
    Yield based on
    the crude oil
    (by volume):              24.2%
Operation conditions:
    Temperature:              950°C.
    Pressure:                 Atmospheric pressure
    H2O/C (molar
    ratio):                   4
    Space velocity:           2,200 Hr⁻¹
Reaction product composition (molar %):
    H2: 56.6,  CO: 8.4,  CO2: 18.0,  CH4: 17.0
```

No carbon deposition on the catalyst was observed.

EXAMPLE 6

Steam reforming of another crude oil was carried out by using the same catalyst as in Example 5 to obtain the following results:

```
Properties of crude oil (Kuwait crude oil fraction):
    Final boiling
    point:                    360°C.
    Specific gravity:         0.7835
    Elementary ana-
    lysis (wt. %):            C: 85.34,  H: 13.86,  S: 1.26
    Yield based on
    the crude oil
    (by volume):              61%
Operation conditions:
    Temperature:              1,000°C.
    Pressure:                 Atmospheric pressure
    H2O/C (molar
    ratio):                   4
    Space velocity:           2,300 Hr⁻¹
Reaction product composition (molar ratio):
    H2: 59.5,  CO: 10.5,  CO2: 16.6,  CH4: 13.4
```

No carbon deposition on the catalyst was observed. Though the fraction containing 1.26 wt. percent of sulfur was used as raw material, no influence of sulfur was recognized. No change of the catalyst used was found.

EXAMPLE 7

Kuwait crude oil was steam reformed by using the same catalyst as in Example 5 to obtain the following results:

```
Operation conditions:
    Temperature:              1,100°C.
    Pressure:                 Atmospheric pressure
    H2O/C (molar
    ratio):                   4
    Space velocity:           2,400 Hr⁻¹
Reaction product composition (molar %):
    H2: 65.6,  CO: 12.8,  CO2: 16.1,  CH4: 5.5
```

No carbon deposition on the catalyst was detected. Though the fraction containing 2.93 wt. percent of sulfur was used as raw material, no influence of sulfur was observed. No change of the catalyst used was found.

EXAMPLE 8

Steam reforming was carried out by using the same catalyst as in Example 5 under the same conditions as in Example 7 but pressure of 30 Kg/cm² to obtain the following results:

```
Operation conditions:
    Temperature:              1,050°C.
    Pressure:                 30 Kg/cm²
    H2O/C (molar
    ratio):                   4
    Space velocity:           2,000 Hr⁻¹
Reaction product composition (molar ratio):
    H2: 58.1,  CO: 11.3,  CO2: 13.4,  CH4: 17.2
```

No carbon deposition on the catalyst was detected. Though the fraction containing 2.93 wt. percent of sulfur was used as raw material, no influence of sulfur was observed. No change of the catalyst used was found.

EXAMPLE 9

Mixture of beryllium oxide, calcium hydroxide and aluminum hydroxide was blended with water, molded, and calcined by heating at 1,300°C. for several hours to obtain $BeO\text{-}CaO\text{-}Al_2O_3$ catalyst.

By using the catalyst, n-heptane and Kuwait crude oil were steam-reformed to obtain the following results:

Catalyst composition (wt. %) was as follows:
    BeO: 7.5,   CaO: 32.0,   $Al_2O_3$: 59.0

| Raw material | Reaction temperature (°C) | Steam/carbon (molar ratio) | Composition of evolved gas (vol. %) | | | | |
|---|---|---|---|---|---|---|---|
| | | | $H_2$ | CO | $CO_2$ | $CH_4$ | $C_2H_4$ |
| n-Heptane | 900 | 3 | 53.0 | 3.5 | 19.5 | 21.0 | 3.0 |
| Kuwait crude oil | 950 | 4 | 53.7 | 5.1 | 19.5 | 20.2 | 1.5 |
| Kuwait crude oil | 1,000 | 4 | 56.5 | 9.2 | 18.0 | 15.8 | 0.5 |

-continued

Catalyst composition (wt. %) was as follows:
BeO: 7.5, CaO: 32.0, Al$_2$O$_3$: 59.0

| Raw material | Reaction temperature (°C) | Steam/carbon (molar ratio) | Composition of evolved gas (vol. %) | | | | |
|---|---|---|---|---|---|---|---|
| | | | H$_2$ | CO | CO$_2$ | CH$_4$ | C$_2$H$_4$ |
| Kuwait crude oil | 1,050 | 4 | 58.5 | 15.4 | 16.0 | 10.5 | — |

EXAMPLE 10

Mixture of beryllium oxide, strontium carbonate and aluminum hydroxide was blended with water, molded and calcined by heating at 1,300°C. for several hours to obtain BeO-SrO-Al$_2$O$_3$ catalyst.

By using the catalyst, n-heptane and Kuwait crude oil were steam reformed to obtain the following results:

Catalyst composition (wt. %) was as follows:
BeO: 6.4, SrO: 30.8, Al$_2$O$_3$: 62.5

| Raw material | Reaction temperature (°C) | Steam/carbon (molar ratio) | Composition of evolved gas (vol. %) | | | | |
|---|---|---|---|---|---|---|---|
| | | | H$_2$ | CO | CO$_2$ | CH$_4$ | C$_2$H$_4$ |
| n-Heptane | 900 | 3 | 52.5 | 4.2 | 19.0 | 21.2 | 3.1 |
| Kuwait crude oil | 950 | 4 | 55.1 | 5.5 | 19.0 | 19.0 | 1.4 |
| Kuwait crude oil | 1,000 | 4 | 57.5 | 9.8 | 18.0 | 14.6 | 0.1 |
| Kuwait crude oil | 1,050 | 4 | 58.2 | 15.8 | 16.0 | 10.0 | — |

EXAMPLE 11

Mixtures of strontium carbonate, aluminum hydroxide and calcium hydroxide in the following three proportions were blended with water, molded and calcined under heating at 1,300°C. for several hours to obtain SrO-Al$_2$O$_3$-CaO catalysts.

By using the catalysts, n-heptane and Kuwait crude oil were steam reformed to obtain the following results:

| Raw material | Proportion (wt. %) | | | Reaction temperature (°C) | Steam/carbon (molar ratio) | Composition of evolved gas (vol. %) | | | | |
|---|---|---|---|---|---|---|---|---|---|---|
| | SrO | Al$_2$O$_3$ | CaO | | | H$_2$ | CO | CO$_2$ | CH$_4$ | C$_2$H$_4$ |
| n-Heptane | 10 | 45 | 45 | 900 | 3 | 52.7 | 3.5 | 19.7 | 21.0 | 3.2 |
| n-Heptane | 20 | 40 | 40 | 900 | 3 | 52.2 | 3.8 | 19.5 | 21.5 | 3.2 |
| n-Heptane | 30 | 35 | 35 | 900 | 3 | 51.0 | 3.2 | 19.7 | 23.2 | 3.2 |
| Kuwait crude oil | 20 | 40 | 40 | 950 | 4 | 55.0 | 4.8 | 19.5 | 19.0 | 1.6 |
| Kuwait crude oil | 20 | 40 | 40 | 1,000 | 4 | 54.5 | 8.0 | 19.6 | 17.0 | 0.7 |
| Kuwait crude oil | 20 | 40 | 40 | 1,050 | 4 | 56.0 | 16.0 | 17.6 | 10.2 | — |

Only in case Kuwait crude oil was steam reformed at 950°C. in this example, slight carbon deposition was observed.

EXAMPLE 12

By using a catalyst having the composition of 36.2 wt. percent of SrO, 35.5 wt. percent of Al$_2$O$_3$, 19.5 wt. percent of CaO and 8.7 wt. percent of BeO, Kuwait crude oil was steam reformed under an elevated pressure to obtain the following results:

Reaction pressure: 39 Kg/cm$^2$
Reaction temperature: 1,050°C.
Steam/carbon ratio: 4.0
Gas composition (molar %): H$_2$: 56.3, CO: 12.0, CO$_2$: 1.30, CH$_4$: 18.5

The reaction was continued for 24 hours, but no carbon deposition was observed at all.

The embodiments of the invention in which an exclusive property or privilege is claimed are defined as follows:

1. A process for manufacturing gaseous mixtures rich in hydrogen by the catalytic steam reforming of a feed stock of normally liquid hydrocarbons which comprises feeding into a reactor said feed stock and steam at a molar ratio of steam/carbon in the range of from about 2/1 to 10/1 and therein contacting same with particles of reforming catalyst, at a temperature in the range of from above 850° to 1100°C, at a pressure of from 1 to 300 atmospheres, at a space flow velocity of from 1000 to 3000/hr. said reforming catalyst consisting essentially of a silica free crystalline eutectic of 20 to 60 weight percent of calcium oxide and the balance of aluminum oxide, and wherein the steam/carbon molar ratio and the reaction temperature are effective to prevent deposition of carbon on said reforming catalyst.

2. The process of claim 1, in which the feed stock is selected from petroleum hydrocarbons in the range of from naphtha to crude oil.

3. The process of claim 2, in which the feed stock is crude oil and the temperature is from 1050° to 1100°C.

* * * * *